US010223802B2

(12) United States Patent
Lange et al.

(10) Patent No.: US 10,223,802 B2
(45) Date of Patent: *Mar. 5, 2019

(54) METHOD FOR DETERMINING DEPTH MAPS FROM STEREO IMAGES WITH IMPROVED DEPTH RESOLUTION IN A RANGE

(71) Applicant: Conti Temic microelectronic GmbH, Nuremberg (DE)

(72) Inventors: Frederik Lange, Nuremberg (DE); Robert Stueck, Lindau (DE); Christian Exner, Bodolz (DE); Alexander Bachmann, Lindau (DE); Gregory Baratoff, Wangen (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 19 days.

This patent is subject to a terminal disclaimer.

(21) Appl. No.: 15/475,847

(22) Filed: Mar. 31, 2017

(65) Prior Publication Data

US 2017/0270680 A1    Sep. 21, 2017

Related U.S. Application Data (63) Continuation of application No. 14/655,149, filed as application No. PCT/DE2014/200001 on Jan. 14, 2014, now Pat. No. 9,704,253.

(30) Foreign Application Priority Data

Jan. 14, 2013    (DE) ..................... 10 2013 100 344

(51) Int. Cl.
*G06T 7/55*    (2017.01)
*G06K 9/52*    (2006.01)
(Continued)

(52) U.S. Cl.
CPC .............. *G06T 7/55* (2017.01); *G06K 9/52* (2013.01); *G06K 9/6215* (2013.01); *G06T 7/593* (2017.01);
(Continued)

(58) Field of Classification Search
CPC ...... G06T 7/0075; G06K 9/6215; G06K 9/52; H04N 13/0271; H04N 2013/0081
(Continued)

(56) References Cited

U.S. PATENT DOCUMENTS 5,179,441 A * 1/1993 Anderson ................ G06K 9/32
                                                                          348/43
6,314,211 B1   11/2001 Kim et al.
(Continued)

FOREIGN PATENT DOCUMENTS

DE    102008015535    8/2008
DE    102007027958    12/2008
(Continued)

OTHER PUBLICATIONS

Stefan K. Gehrig et al., "Improving Stereo Sub-Pixel Accuracy for Long Range Stereo", IEEE 11th International Conference on Computer Vision, Oct. 14-21, 2007, Rio de Janeiro, XP031194701, pp. 1 to 7.
(Continued)

*Primary Examiner* — Amandeep Saini
(74) *Attorney, Agent, or Firm* — W. F. Fasse (57) ABSTRACT

In a method for determining a depth map from stereo images, the disparity for a pixel is selected from a predefined quantity or set of predefined discrete disparity values that are distributed over the entire predefined disparity value range, whereby the distribution is non-uniform or has at least two different distances or intervals between different adjacent disparity values. This method makes it possible to more
(Continued)

precisely determine (with finer resolution) especially only those disparities for which a more precise determination is required.

29 Claims, 4 Drawing Sheets

(51) Int. Cl.
    *G06K 9/62* (2006.01)
    *H04N 13/271* (2018.01)
    *G06T 7/593* (2017.01)
    *H04N 13/00* (2018.01)

(52) U.S. Cl.
    CPC ... *H04N 13/271* (2018.05); *H04N 2013/0081* (2013.01)

(58) Field of Classification Search
    USPC .......................................................... 382/190
    See application file for complete search history.

(56) References Cited

U.S. PATENT DOCUMENTS

| | | |
|---|---|---|
| 2009/0316994 A1 | 12/2009 | Boughorbel |
| 2012/0002866 A1 | 1/2012 | Hirschmueller et al. |
| 2013/0215234 A1 | 8/2013 | Lim et al. |
| 2013/0259360 A1 | 10/2013 | Bingrong et al. |

FOREIGN PATENT DOCUMENTS

| | | |
|---|---|---|
| DE | 103 10 849 | 9/2009 |
| DE | 102008046505 | 3/2010 |
| DE | 102010006522 | 9/2010 |
| DE | 102012206329 | 5/2013 |
| DE | 102014017196 | 5/2016 |

OTHER PUBLICATIONS

Pascal Steingrube et al., "Performance Evaluation of Stereo Algorithms for Automotive Applications", Computer Visions Systems, Oct. 13, 2009, Springer Verlag publisher, Berlin, Heidelberg, XP019131958, pp. 285 to 294.

Ingo Feldmann et al., "Navigation Dependent Nonlinear Depth Scaling", 23rd Picture Coding Symposium, Apr. 23-25, 2003, Saint Malo, XP030080071.

I. Feldmann et al., "Nonlinear Depth Scaling for Immersive Video Applications", Digital Media Processing for Mulitmedia Interactive Services, Proceedings of the $4^{th}$ European Workshop on Image Analysis for Multimedia Interactive Services, Queen Mary, University of London, Apr. 9, 2003, XP002581663, pp. 1 to 6.

Stefan K. Gehrig et al., "Real-Time Semi-Global Matching on the CPU", IEEE Computer Society Conference on Computer Vision and Pattern Recognition Workshops, Jun. 13-18, 2010, San Francisco, CA, USA, pp. 85 to 92.

Heiko Hirschmueller, "Accurate and Efficient Stereo Processing by Semi-Global Matching and Mutual Information", Proceedings of the IEEE Conference on Computer Vision and Pattern Recognition, Jun. 20-26, 2005, San Diego, CA, USA, vol. 2, pp. 807 to 814.

Young-Chul Lim et al., "Distance Estimation Algorithm for Both Long and Short Ranges Based on Stereo Vision System", IEEE Intelligent Vehicles Symposium, Jun. 4-6, 2008, Eindhoven, The Netherlands, pp. 841 to 846.

Cosmin D. Pantilie, "SORT-SGM: Subpixel Optimized Real-Time Semiglobal Matching for Intelligent Vehicles", IEEE Transactions on Vehicular Technology, vol. 61, No. 3, Mar. 2012, pp. 1032 to 1041.

René Ranftl et al., "Pushing the Limits of Stereo Using Variational Stereo Estimation", IEEE Intelligent Vehicles Symposium, Jun. 3-7, 2012, Alcala de Henares, Spain, pp. 401 to 407.

Stefan K. Gehrig et al., "A Flexible High-Resolution Real-Time Low-Power Stereo Vision Engine", Computer Vision Systems, vol. 9163 of the series Lecture Notes in Computer Science, ICVS Jun. 19, 2015, pp. 69 to 79. http://link.springer.com/chapter/10.1007/978-3-319-20904-3_7?no-access=true.

International Search Report of the International Searching Authority for International Application PCT/DE2014/200001, dated Jul. 2, 2014, 3 pages, European Patent Office, HV Rijswijk, Netherlands.

PCT International Preliminary Report on Patentability including English Translation of PCT Written Opinion of the International Searching Authority for International Application PCT/DE2014/200001, dated Jul. 14, 2015, 8 pages, International Bureau of WIPO, Geneva, Switzerland.

German Search Report for German Patent Application No. 10 2013 100 344.3, dated Oct. 25, 2013, 6 pages, Muenchen, Germany, with English translation, 5 pages.

R. Spangenberg et al., "Large Scale Semi-Global Matching on the CPU", Intelligent Vehicles Symposium Proceedings, 2014 IEEE, Jun. 8, 2014, pp. 195 to 201.

* cited by examiner

METHOD FOR DETERMINING DEPTH MAPS FROM STEREO IMAGES WITH IMPROVED DEPTH RESOLUTION IN A RANGE

CROSS-REFERENCE TO RELATED APPLICATIONS

This application is a Continuation under 35 USC 120 of U.S. patent application Ser. No. 14/655,149, which was filed on Jun. 24, 2015 as the US National Stage under 35 USC 371 of PCT International Application PCT/DE2014/200001 filed on Jan. 14, 2014, and which issued as U.S. Pat. No. 9,704,253 on Jul. 11, 2017. This application also claims the foreign priority under 35 USC 119 of German Patent Application DE 10 2013 100 344.3 filed on Jan. 14, 2013. The entire disclosures of the prior applications are incorporated herein by reference.

FIELD OF THE INVENTION

The invention relates to a method for determining a depth map from stereo images.

BACKGROUND INFORMATION

In driver assistance systems with a stereo camera, the stereo images can be used for calculating a depth image. A depth image is very helpful for many functions of a driver assistance system, including the collision avoidance, the following of other vehicles, etc.

For determining a depth map from stereo images, different correlation methods can be used for correlating image points or image objects in the left image and the right image of a stereo image pair. These correlation methods or algorithms differ in quality and density of the calculated depth map. In addition, the required computing power and the required amount of memory vary for the computations. Basically, the following classes of correlation methods exist:
1. Local correlation methods
2. Global or semi-global methods with pre-determined disparities/labels (discrete optimization methods)
3. Global methods with continuous disparities (continuous optimization methods, e.g. convex optimization).

The advantages and disadvantages of the various groups and methods are not further discussed here.

In stereo image processing, the "disparity" refers to the distance or shift, i.e. the difference in image point location, of an object as it appears in the left image and in the right image of a stereo image pair.

In an adequately calibrated stereo camera (which is assumed in the following), only the horizontal distances, i.e. the distances along a respective horizontal image row in the camera, need to be considered for determining the disparities.

For practical applications the algorithms from the second group above have proved to be particularly suitable. Especially SGM (Semi Global Matching) is regarded as the most practical or functional algorithm for use in real-time systems.

It provides both a high quality of the depth map as well as, compared to most other algorithms, a low demand of computing power and memory. On an FPGA (Field Programmable Gate Array) of the latest available driver assistance camera, it runs in real time with approximately 16 FPS (frames per second, i.e. image pairs per second). A calculation in real time on a signal processor is not feasible in the foreseeable future.

In fact, for the use of SGM there is currently no alternative which would not involve significant disadvantages. SGM is state of the art and is widely in use.

In the algorithms of the second category and in particular SGM, the disparities are determined as integer shifts of the pixels in the image. For this, in a first step, a comparison operator is used per pixel and disparity. In practice and according to the state of the art, the census operator has proved to be a particularly robust comparison operator.

For this example, the right image is used as the reference image and (x,y) is a pixel coordinate in the image. Then the census operator result or signature is determined for each pixel $P\_r(x,y)$ in the right image. In the left image, the census operator result or signature is determined for the pixel $P\_l(x+d,y)$ with $d=0, \ldots, d\_max$, and is compared with the census result or signature from the right image. This therefore results in a cost measure $C(x,y,d)$ per pixel and disparity. For the entire image, this results in a three dimensional space, which is called the cost volume. Based on this cost volume SGM performs an optimization, which determines a disparity for each pixel as a result. In addition to the integer disparity values, SGM determines, by means of an interpolation of the internal costs, which are available for integer and uniformly distributed disparities, a sub-pixel precise disparity.

The disparity does not directly indicate the distance z of the object to the camera. The connection or relationship is reciprocal, and in the present example the z-distance can be computed from the disparity d by:

$$z = C1 * 1/(d+C2) \tag{1}$$

wherein C1 and C2 are constants. In a calibrated stereo camera C2=0 applies.

C1=f*b in a calibrated camera depends on the following parameters:
    f focal length in pixels
    b base width The accuracy of a depth measurement is, therefore, dependent on the depth. In the near or close range a higher accuracy is achieved than in the far range. Given a maximum disparity d_max, also the minimum determinable distance z_min depends on C1.

The value z_min is predefined from or by the requirements of a camera system. A minimal determinable distance must be able to be achieved.

In practice, the accuracy in the far range has turned out to be particularly critical. The accuracy in the near or close range is more than sufficient for use in driver assistance systems.

According to the state of the art there are several techniques to increase the accuracy. They are described with their advantages and disadvantages in the following:

1. Interpolation of the Costs

For each pixel, the disparity defined by SGM is selected. This disparity is refined while considering the cost of the adjacent disparities. This can be done by a quadratic interpolation with minima-search of the three disparities. Other interpolation schemes (equi-angular fit) are also possible. Details are described in Heiko Hirschmüller, Accurate and Efficient Stereo Processing by Semi-Global Matching and Mutual Information, in Proceedings of the IEEE Conference on Computer Vision and Pattern Recognition, 20-26 Jun. 2005, San Diego, Calif., United States, Volume 2, pp. 807-814, and improvements can be found e.g. in m Stefan K.

Gehrig, Uwe Franke, Improving Stereo Sub-Pixel Accuracy for Long-Range Stereo ICCV of 2007.

The advantage of this method is the simple and resource-efficient implementation. However, the disadvantage is that this method often cannot significantly improve the results. One of the main reasons is the effect of the "pixel-locking", an artifact formation in the sub-pixel interpolation of objects, which are represented by a relatively small number of pixels in the image. Due to the pixel-locking, certain interpolated positions (such as e.g. centers or edge points of the pixels) are over-represented.

2. Finer Sampling of the Disparities

In Stefan K. Gehrig, Uwe Franke, Improving Stereo Sub-Pixel Accuracy for Long-Range Stereo ICCV 2007 it is also outlined that, by a finer sampling of the disparities, the accuracy of the depth map can be significantly improved.

In that publication, the resolution of the cost volume is increased in the dimension d (of the disparity) of the cost volume, by inserting intermediate steps with 0.5 or 0.25 pixel disparities. The costs of the intermediate steps are interpolated from the adjacent costs in the example. As a result the cost volume thus contains 2 or 4 times more disparities.

The disadvantage of the finer sampling is that the need for resources, i.e. computing power, amount of memory and memory bandwidth, increases linearly with the number of the disparities.

3. Sub-Pixel Refinement

Starting from an original disparity map the disparities can be refined locally. For this, local correlation methods are used on the two images.

These methods, however, work only in image ranges with a high contrast, i.e. at edges, etc. In practice, it is, therefore, unrealistic to densely refine a disparity map with such methods.

4. Hierarchical Refinement Scheme

In Stefan K. Gehrig, Clemens Rabe, Real-time Semi-Global Matching on the CPU, CVPR 2010 a method is described, in which the disparities in the near or close range are determined with a lower resolution than in the far range. However, this does not apply only for the disparities, but also for the xy-resolution of the pixels. Smaller objects in the near or close range can possibly not be recognized in this way.

In DE 103 10 849 A1 a method for photogrammetric distance and/or position determination is shown, which implements a hierarchical measurement range adjustment. Here, from an original reference and search-gray-scale image pair, p new pairs with an increasingly reduced resolution are produced.

In all resolution steps, now similarity measures are determined for reference image blocks with equally sized search image blocks, wherein the search image blocks are respectively shifted in the respective search gray-scale image pair in the line or row direction with a step size of one pixel. The disparity for a reference block is determined by searching sequences of similarity measures for this reference block with regard to extreme values, wherein for all resolution steps except the original resolution step an area at the beginning of the sequence of similarity measures, which was already detected in the preceding resolution step, is respectively excluded from the search. From the location of the identified extreme value, the position of the corresponding object point is determined in a conventional manner.

The disadvantage with this local method is the high expenditure when generating the p image pairs with reduced resolution and the high iteration demands for the disparity determination.

5. Calculation of Overview and Magnifier Map

In DE 10 2008 015 535 A1 it is described that an overview map and a magnifier map can be calculated separately. In this regard, the overview map works at the half resolution over the entire image range, and the magnifier map works in the full resolution, however, only in a variable section of the image.

The disadvantages of the above known method are that the magnifier map is not present for the entire image and that the amount of required resources is doubled by calculating the magnifier map, or that in two separate steps first the entire image is calculated with a reduced resolution and then the magnifier map is calculated with an increased resolution.

SUMMARY OF THE INVENTION

It is an object of one or more embodiments of the present invention to provide a method for determining a depth map from stereo images, which offers a better resolution over a large distance range without having to accept the disadvantages of the methods known from the prior art.

A starting point for the method according to the invention is the method described in the above section 2, i.e. regarding finer sampling of disparities wherein, however, its disadvantages regarding the increased demand for resources shall be avoided. As described in the beginning of this specification, the accuracy problems exist only in one single range, e.g. in the far range.

Thus a basic idea of an embodiment of the invention is not to sample all disparities in a finer way, but only for those ranges, in which the accuracy is to be increased.

An alternative basic idea of another embodiment of the invention is to produce a reference image and a search image from a stereo image pair, wherein the resolution (especially in the horizontal direction) of the reference image is reduced by an integer factor k compared to that of the search image. This allows for a disparity determination with an accuracy of 1/k (pixels) by means of a comparison/similarity operator directly without interpolation.

A method according to an embodiment of the invention for determining a depth map from stereo images provides that the disparity is determined by being selected from a predefined discrete quantity or set of predefined discrete disparity values. The predefined disparity values are distributed over the entire predefined disparity value range and this distribution includes at least two different distances or intervals between adjacent disparity values. In this regard, the term disparity refers to the shift or difference in image location of an object as it appears in the left image and the right image of a stereo image pair. An advantage of a calibrated stereo camera is that only the shift in a line or image row is to be taken into account. The disparity is preferably determined pixel by pixel (i.e. with reference to a pixel of one of the input images, e.g. of the right stereo image). The value of the determined disparity can be an integer pixel value, but preferably the quantity or set of predefined disparity values also contains sub-pixel values, such as e.g. shifts by a half pixel or a quarter pixel.

In other words, the method according to an embodiment of the invention can be described as follows: disparities are determined from at least one stereo image pair, wherein the disparities are selected from a predefined quantity or set of predefined discrete disparity values, wherein the predefined potential (discrete) disparity values are not uniformly distributed over the entire disparity value range.

The advantage of such an embodiment of the method according to the invention is seen in that the gradation of the disparity values and thus the depth resolution can be adapted to the distance range.

In an advantageous embodiment, the distances or intervals between two adjacent disparity values, in which disparities are determined for a far range, are smaller than the other distances or intervals between two adjacent disparity values i.e. at other than the far range. In the far range, the shifts or disparities m are small due to the reciprocal relation between disparity and distance, which limits the depth resolution in the far range. By providing a finer distribution of the predefined disparity values in the far range, the depth resolution can be improved specifically for the far range.

This is particularly advantageous for an application of the method in stereo camera based driver assistance systems, as here a higher resolution is needed in the far range to better spatially resolve more distant objects.

In order to keep the total number of disparities to be calculated for an image the same, and without increasing the minimum calculable close-up limit, sampling in the close or near range can be reduced advantageously for this purpose. Distances or intervals between two adjacent disparity values, in which disparities for the close or near range are determined, thus can be larger than the other remaining distances or intervals between two adjacent disparity values i.e. at other than the near range (by predefining the discrete disparity values in a suitably distributed manner).

A far range can for example be at least 10 meters away from the stereo camera, with which the stereo images are recorded. A close or near range can for example be a maximum of 5 meters away from the stereo camera.

Advantageously, at least one interval or distance between two adjacent disparity values can have a sub-pixel size, i.e. a size below one pixel (sub-pixel).

Preferably, comparison/similarity costs for a disparity in the stereo image pair are determined by a suitable comparison operator, advantageously by the census operator. The disparity value for a pixel can then be determined as that disparity value with the lowest comparison/similarity costs.

Preferably, comparison/similarity costs for sub-pixel disparities are determined from the comparison/similarity costs of the adjacent integer disparities by interpolation, and the comparison/similarity costs of the integer disparities are determined by an appropriate comparison operator from the stereo image pair.

Advantageously, when specifying the distances or intervals between adjacent predefined disparity values within the predefined quantity of disparity values, effects caused by over-sampling or subsampling (under-sampling) are taken into account.

In a preferred form of embodiment, the disparities are determined by a global or semi-global matching or correspondence method.

Preferably, for determining all disparities of the depth map of a stereo image or of all stereo images, always the same (non-uniform) disparity value distribution is used.

In an advantageous form of embodiment, a reference image and a search image are produced from a stereo image pair, wherein the resolution (especially horizontal) of the reference image is reduced by an integer factor k compared to that of the search image. Disparity values are determined with an accuracy of 1/k pixels on the basis of the reference and the search image.

The invention further comprises an apparatus comprising a stereo camera for recording stereo images and a determination unit that is configured to evaluate the stereo images recorded with the stereo camera, wherein the evaluation is performed according to a method of the invention.

In principle, the disparities for a pixel in the cost volume correspond to a set of possible labels for a pixel. SGM calculates the allocation or assignment of the labels to the pixels. For each label, the cost for allocating or assigning this label to the pixel is determined. At the end, the label i.e. the disparity value with the lowest cost is selected. In SGM and all other known methods that use fixed labels i.e. predefined discrete disparity values for the disparities, the labels or disparity values are uniformly distributed over the disparity value range. A continuous value, namely the disparity, is thus subdivided into uniform intervals predefined by the labels.

In comparison, in the method according to an embodiment of the invention, the intervals over the disparity range are no longer uniform. The intervals of the labels (i.e. distances between two adjacent disparity values) can be freely selected in principle.

Effects caused by under-sampling or oversampling can be taken into account in the selection of the intervals. Alternatively, the original input images can also be filtered accordingly. This is particularly important during under-sampling.

It is proposed in Stefan K. Gehrig, Uwe Franke, Improving Stereo Sub-Pixel Accuracy for Long Range Stereo ICCV 2007, that the costs for the disparities can be interpolated from the costs of the adjacent disparities. In particular, by fitting a parabola using adjacent costs and calculating the minimum value of this parabola, a sub-pixel precise determination of the disparities can be achieved. Alternatively, they can also be determined directly in the image. For this it is advantageous, when the disparities and thus the costs are determined only for integer pixel indices. Also both methods for determining the costs for the disparities can be combined.

Adjustments in regularization can be made where appropriate. In SGM the (adaptive) penalty terms P1 (delta_d=1) and P2 (delta_d>1) are used as regularization for the disparity jumps or steps (see formula (11) in Heiko Hirschmüller, Accurate and Efficient Stereo Processing by Semi-Global Matching and Mutual Information, in Proceedings of the IEEE Conference on Computer Vision and Pattern Recognition, 20-26 Jun. 2005, San Diego, Calif., United States, Volume 2, pp. 807-814). It may be advantageous to adapt these to the sampling intervals or to supplement them by further penalty terms.

Examples of embodiments of the invention and the resulting advantages are exemplified in the following and illustrated by figures. For this, the accuracy of the results between a uniform distribution of the disparities and a non-uniform distribution according to the invention is compared.

The following assumptions are made:
Resolution of the disparity map: 512*256 pixels
Resolution of the stereo images: 1024*512, 512*256
Number of disparities (labels): 64 (0 . . . 63)
Base width b: 12 cm
Focal length f: 1145
Comparison operator: census
(window size x=9, y=7)
Uniform Sampling:
Each disparity here corresponds to a shift of one pixel in the image. The images are used with 512 pixels per line or image row. This image is produced from the original image with a resolution of 1024 pixels per line or image row by filtering with subsequent under-sampling.

Non-Uniform Sampling:

The resolution of the disparity (or the spacing interval between two adjacent disparity values) is determined according to the following disparity value ranges:

| Intervals in pixel | Resolution of the disparity (referred to a resolution of 512 pixels per line) |
|---|---|
| 0-10.5 | 0.5 |
| 10.5-31.5 | 1 |
| 31.5-63 | 1.5 |

The right reference image is used in this regard for the non-uniform sampling, like it is also for the uniform sampling.

The left image is used with 1024 pixels per line or image row. This image is produced from the original image with a resolution of 1024 pixels per line by filtering. Only every second line is calculated. Because of the double resolution per line or image row in the left image, the census operator can be determined also directly without interpolation for disparities of 0.5, 1.5, etc. This was considered in the selection of the intervals and the resolution of the disparity. The maximum disparity is here also predefined as 63 by the intervals or distances between adjacent disparity values in the different disparity value ranges. Thus, the same image distance range can be displayed.

After having calculated the disparities, the output is calculated back to a neutral format. How the labels for the disparities are then occupied is not visible in the output and is transparent for the following processing steps. Transparent here means that the algorithms that build upon the disparity map do not have to consider or take account of the non-uniform sampling.

BRIEF DESCRIPTION OF THE DRAWINGS

In order that the invention may be clearly understood it will now be described in connection with example embodiments thereof, with reference to the accompanying drawings, wherein.

DETAILED DESCRIPTION OF EXAMPLE EMBODIMENTS OF THE INVENTION

Figure 1:
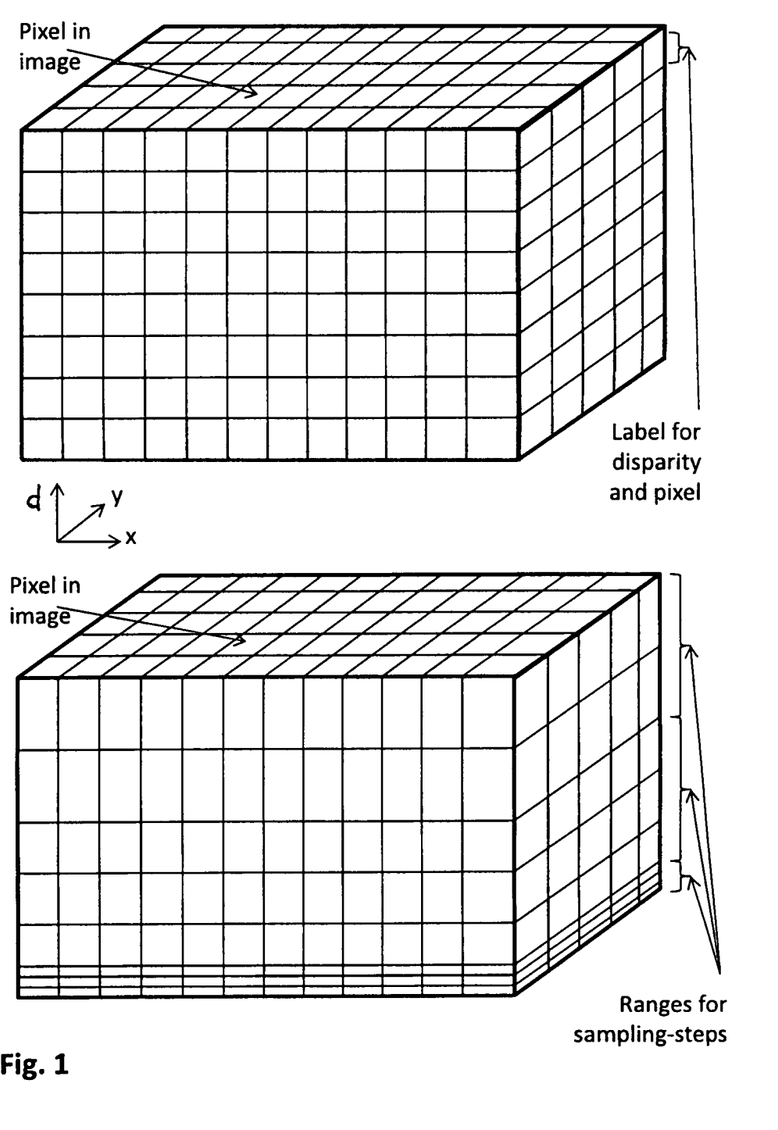
FIG. 1 shows an exemplary illustration of the cost volume and allocation of the labels. At the top: uniform sampling, bottom: non-uniform sampling according to the invention.

FIG. 1 shows, as an example, the mapping or allocation of the labels to the disparities in the cost volume. The xy-plane represents the pixel plane in the image. The d-axis corresponds to the disparity. Each voxel (volume element x-y-d) includes a cost value for a label. At the top, the uniform distribution of the label to the disparities is shown. At the bottom, the non-uniform distribution with three different sampling stages is shown.

Figure 2:
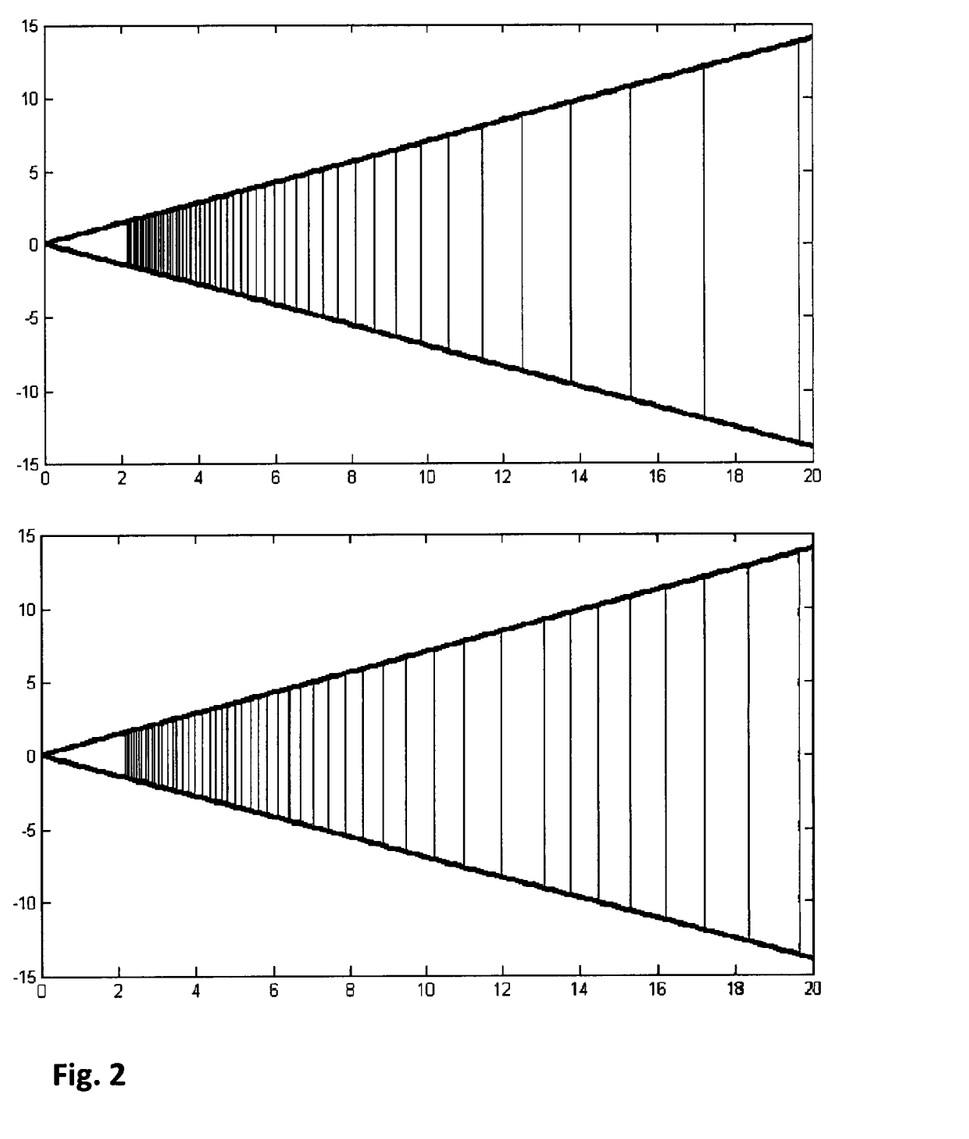
FIG. 2 shows distances, which correspond to disparities in the cost volume. At the top: uniform sampling, bottom: non-uniform sampling according to the invention.

FIG. 2 shows the distances for the disparity labels. The distance to the stereo camera is indicated on the abscissa. A direction perpendicular to the optical axis of the stereo camera is indicated on the ordinate. Thus, the straight, obliquely-sloping, bounding lines characterize the field of view of the stereo camera. The vertical lines correspond to individual predefined disparities. It can be seen that the depth or distance measurement for non-uniform sampling (bottom image of FIG. 2) is resolved twice as precisely in more distant areas, compared to the case of uniform sampling (upper image of FIG. 2).

Figure 3:
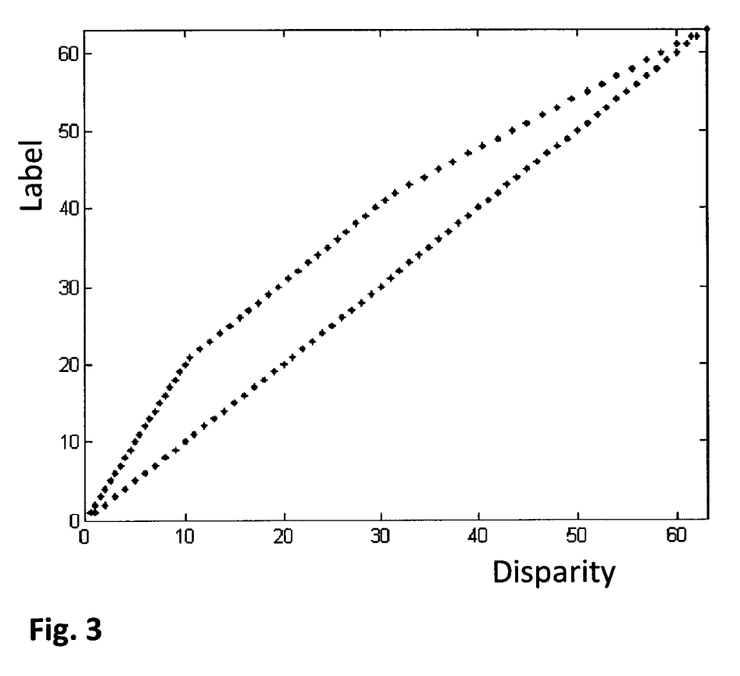
FIG. 3 shows the allocation of the labels to the disparities.

In FIG. 3, the allocation of the labels to the disparities for the given example is shown (see the values in the table above). The points that form a straight diagonal line apply to the uniform sampling, while the points that extend above the straight diagonal line and form three successive line segments with different slopes apply to the non-uniform sampling.

Figure 4:
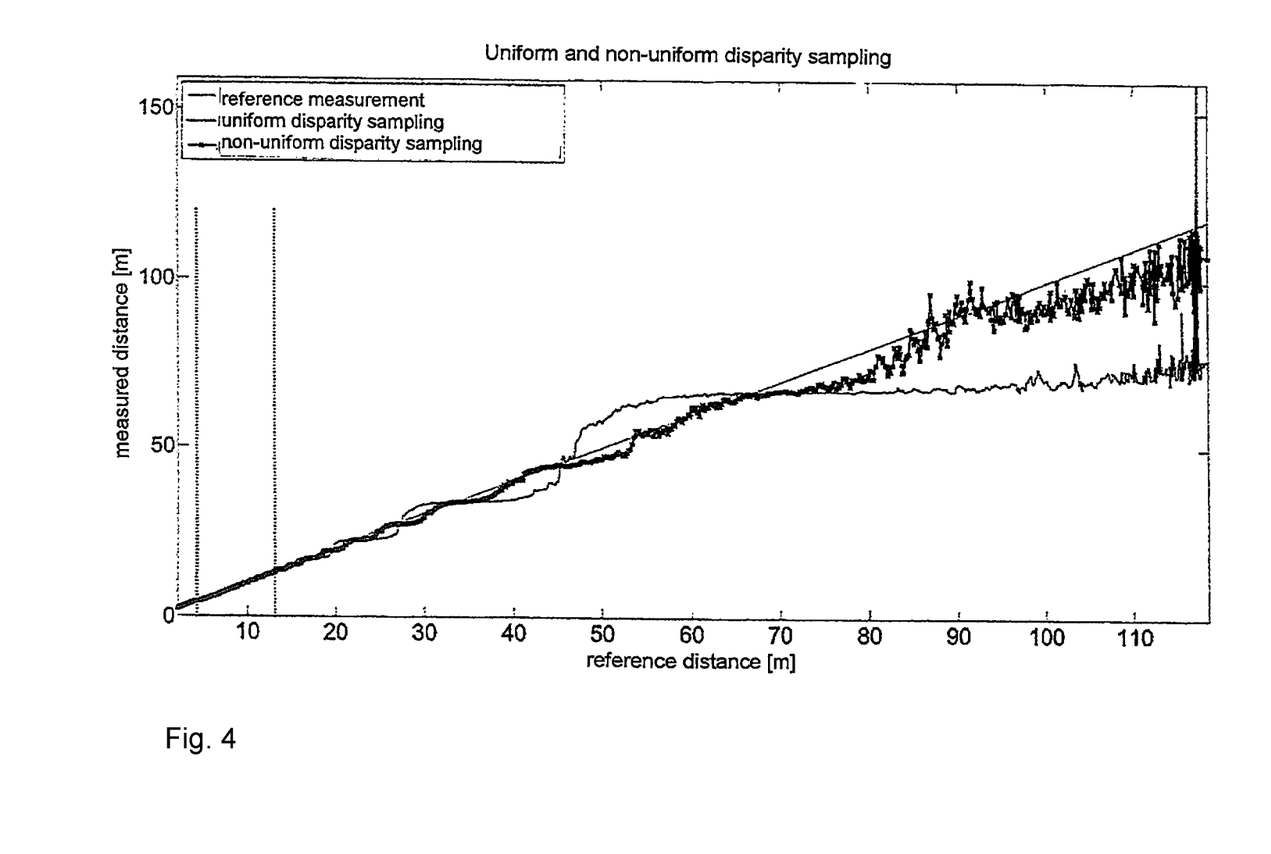
FIG. 4 shows the comparison measurement between uniform and non-uniform sampling.

FIG. 4 shows the results in real measurements. In the test, a vehicle equipped with a stereo camera and an evaluation unit approached a target. The distance measured in meters from the stereo images is plotted above the reference distance (actual distance) in meters. The actual reference distance to the target was precisely determined with a reference sensor (solid line). The measured curve without highlighting the measured points indicates the measurements by SGM with uniform sampling. It can be seen that the distance determination in the distance range up to approx. 15 meters works without significant deviations. For larger distances, however, more and more deviations occur, wherein the measured curve typically comprises steps (in this example approximately at 20 m, 27 m, 47 m and 118 m). Before these steps, the measured distance is in each case shorter than the actual distance, and after the steps the measured distance is greater than the actual distance. This is mainly caused by the fact that in the uniform sampling, for long or far-range distances only a few pixels correspond to large distance differences. The measured curve with highlighting or indication of the measured points shows the measured values determined by the adapted SGM with non-uniform sampling as described in the example embodiment above. The deviations of these measurements are always lower than with the uniform sampling. The improvement in accuracy in the far range is clearly visible.

The method according to one or more embodiments of the invention offers the advantage that only those disparities are calculated more precisely, for which a more precise determination is required. A double resolution in the far range results in savings of nearly 50% of computing resources compared to an implementation with an overall doubled resolution in all distance ranges. With four times the resolution, the savings are nearly 75%.

The invention claimed is:

1. A method of determining a depth map from stereo image pairs, wherein a respective disparity for at least one respective pixel of one of the stereo image pairs is determined from a discrete quantity of predefined disparity values that are distributed over an entire predefined disparity value range with a distribution that has at least two different intervals between different adjacent ones of the disparity values.

2. The method according to claim 1, wherein at least one of the intervals has a length of less than one pixel spacing.

3. The method according to claim 1, wherein comparison/similarity costs for the disparity values are determined by a suitable comparison operator.

4. The method according to claim 1, wherein the disparity values include integer disparity values and sub-pixel disparity values, comparison/similarity costs of the integer disparity values are determined by an appropriate comparison operator from one of the stereo image pairs, and comparison/similarity costs of the sub-pixel disparity values are determined by interpolation from the comparison/similarity costs of adjacent ones of the integer disparity values.

5. The method according to claim 1, wherein effects caused by over-sampling or sub-sampling are taken into account.

6. The method according to claim 1, wherein the disparity for the respective pixel is determined by a global or semi-global matching or correspondence method.

7. The method according to claim 6, wherein the disparity is further refined sub-pixel precisely based on the disparity value with minimal cost among comparison/similarity costs of adjacent ones of the disparity values.

8. An apparatus for determining a depth map from stereo image pairs according to the method of claim 1, comprising a stereo camera configured and arranged to record the stereo image pairs, and a determination unit configured and arranged to evaluate the stereo image pairs recorded by the stereo camera according to the method.

9. A method of determining a depth map from at least one stereo image pair, wherein disparities are determined from the at least one stereo image pair by selecting the disparities from among predetermined potential disparity values that are non-uniformly distributed over an entire disparity value range of the disparity values.

10. The method according to claim 9, wherein intervals between two adjacent ones of the disparity values, in which disparities for a close range are determined, are larger than other intervals between two other adjacent ones of the disparity values in which disparities for other than the close range are determined.

11. The method according to claim 10, wherein the close range is a maximum of 5 meters away from a stereo camera, with which the at least one stereo image pair is recorded.

12. The method according to claim 9, wherein the disparities are determined by a global or semi-global matching or correspondence method.

13. The method according to claim 9, wherein at least one interval between two adjacent ones of the disparity values is smaller than a pixel.

14. The method according to claim 9, wherein effects caused by over-sampling or sub-sampling are taken into account.

15. The method according to claim 9, wherein similarity costs for the disparities are determined.

16. The method according to claim 15, wherein the similarity costs of one of the disparities are determined from the similarity costs of adjacent ones of the disparities.

17. The method according to claim 15, wherein the similarity costs of one of the disparities are determined directly from the stereo image pair.

18. The method according to claim 17, wherein the disparities and the similarity costs thereof are determined only for intervals between two adjacent disparity values, which correspond to one or more whole pixels.

19. A method of determining a depth map, comprising the steps:
   a) with a stereo camera, providing at least one stereo image pair;
   b) providing, in an evaluation unit, a predefined set of discrete disparity values that span a disparity value range, wherein intervals between successive ones of the disparity values include first intervals and second intervals, wherein the first intervals have a magnitude smaller than that of the second intervals;
   c) in the evaluation unit, determining a respective disparity for a respective pixel of a reference image of the at least one stereo image pair, comprising selecting the respective disparity from among the discrete disparity values of the predefined set; and
   d) in the evaluation unit, determining a respective depth value for the respective pixel by calculation from the respective disparity that was determined for the respective pixel.

20. The method according to claim 19, wherein the intervals further include third intervals that have a magnitude between those of the first intervals and the second intervals.

21. The method according to claim 20, wherein the first intervals are provided between successive ones of the disparity values corresponding to a far-range of depth, the second intervals are provided between successive ones of the disparity values corresponding to a near-range of depth, and the third intervals are provided between successive ones of the disparity values corresponding to a mid-range of depth.

22. The method according to claim 19, wherein the first intervals are provided between successive ones of the disparity values corresponding to a far-range of depth, and the second intervals are provided between successive ones of the disparity values corresponding to a near-range of depth.

23. The method according to claim 19, wherein the first intervals are provided in a first value range of the disparity values, and the second intervals are provided in a second value range of the disparity values different from the first value range.

24. The method according to claim 19, wherein the first intervals are provided between successive ones of the disparity values corresponding to a first depth range in which an accuracy, a precision or a resolution of the determination of the depth value in the step d) is to be increased, and the second intervals are provided between successive ones of the disparity values corresponding to a second depth range other than the first depth range.

25. The method according to claim 19, further comprising performing the step c) of determining the respective disparity respectively for each pixel of the reference image using the predefined set of discrete disparity values again respectively for each pixel, which comprises selecting the respective disparity for each pixel respectively from among the discrete disparity values of B the predefined set.

26. The method according to claim 25, wherein the at least one stereo image pair includes a succession of plural stereo image pairs, and the step c) comprises performing the determining of the respective disparity respectively for each pixel of all of the stereo image pairs using the predefined set of discrete disparity values again respectively for each pixel of all of the stereo image pairs.

27. The method according to claim 25,
   wherein the step c) further comprises forming a cost volume representing a respective cost value associated respectively with each discrete disparity value of the predefined set assigned to each pixel of the reference image, and
   wherein the selecting in the step c) comprises, respectively for each respective pixel of the reference image, selecting as the respective disparity for the respective pixel, the one of the discrete disparity values having the lowest cost value associated therewith among the cost values of all of the discrete disparity values of the predefined set assigned to the respective pixel.

28. The method according to claim 19, wherein the selecting in the step c) comprises determining a respective cost value respectively associated with each one of the discrete disparity values of the predefined set for the respective pixel of the reference image, and selecting, as the respective disparity for the respective pixel, the one of the discrete disparity values having the lowest cost value associated therewith among the cost values of all of the discrete disparity values of the predefined set for the respective pixel.

29. The method according to claim 28, further comprising performing the step c) respectively for all pixels of the reference image using the predefined set of discrete disparity values again respectively for each one of the pixels.

\* \* \* \* \*

UNITED STATES PATENT AND TRADEMARK OFFICE
CERTIFICATE OF CORRECTION

PATENT NO. : 10,223,802 B2  
APPLICATION NO. : 15/475847  
DATED : March 5, 2019  
INVENTOR(S) : Frederik Lange et al.

Page 1 of 1

It is certified that error appears in the above-identified patent and that said Letters Patent is hereby corrected as shown below:

In the Specification

Column 2,
Line 67, after "e.g. in", delete "m";

Column 5,
Line 12, after "disparities", delete "m";

Column 7,
The table between Lines 7 to 15 should read:

| Disparity value range in pixels | Resolution of the disparity in pixels (with reference to a resolution of 512 pixels per image row) |
|---|---|
| 0-10.5 | 0.5 |
| 10.5-31.5 | 1 |
| 31.5-63 | 1.5 |

;

In the Claims

Column 10,
Line 47, after "values of", delete "B".

Signed and Sealed this  
Third Day of September, 2019

Andrei Iancu  
*Director of the United States Patent and Trademark Office*